(12) United States Patent
Tanaka

(10) Patent No.: US 6,798,893 B1
(45) Date of Patent: Sep. 28, 2004

(54) DIGITAL WATERMARKING TECHNIQUE

(75) Inventor: Nobuyuki Tanaka, Tokyo (JP)

(73) Assignee: NEC Corporation, Tokyo (JP)

(*) Notice: Subject to any disclaimer, the term of this patent is extended or adjusted under 35 U.S.C. 154(b) by 581 days.

(21) Appl. No.: 09/642,476

(22) Filed: Aug. 18, 2000

(30) Foreign Application Priority Data

Aug. 20, 1999 (JP) .............................................. 11-234250

(51) Int. Cl.$^7$ ............................. G06K 9/00; G06K 9/36; H04N 7/167; H04N 7/12; H04N 11/02; H04N 11/04

(52) U.S. Cl. ...................... 382/100; 382/232; 380/217; 348/384.1

(58) Field of Search ................................ 382/100, 232, 382/236, 238; 375/240.01, 240.16, 240.26; 348/384.1, 402.1; 380/201, 217

(56) References Cited

U.S. PATENT DOCUMENTS

| | | | | |
|---|---|---|---|---|
| 6,005,643 A | * | 12/1999 | Morimoto et al. | 375/240.26 |
| 6,175,639 B1 | * | 1/2001 | Satoh et al. | 382/100 |
| 6,208,745 B1 | * | 3/2001 | Florencio et al. | 382/100 |
| 6,222,932 B1 | * | 4/2001 | Rao et al. | 382/100 |
| 6,415,041 B1 | * | 7/2002 | Oami et al. | 382/100 |
| 6,418,232 B1 | * | 7/2002 | Nakano et al. | 382/100 |

FOREIGN PATENT DOCUMENTS

| | | |
|---|---|---|
| EP | 0 860 997 A2 | 8/1998 |
| JP | 10-313402 | 11/1998 |
| JP | 11-55639 | 2/1999 |
| WO | WO 99/22480 | 5/1999 |

OTHER PUBLICATIONS

Verscheure et al., "Perceptual bit allocation for MPEG–2 CBR video coding," 1996, pp. 1–4.*
Huang, J. et al., "Adaptive image watermarking scheme based on visual masking", *Electronics Letters*, 34(8): 748–750 (1998).
Cox, I. et al., "Secure Spread Spectrum Watermarking for Multimedia", *IEEE Transactions On Image Processing*, 6(12): 1673–1687 (1997).
Swanson, M. et al., "Multiresolution Scene–Based Video Watermarking Using Perceptual Models", *IEEE Journal On Selected Areas In Communication*, 16(4): 540–550 (1998).
Korean Office Action dated May 29, 2002; Japanese translation; Verified Translation in English.

* cited by examiner

*Primary Examiner*—Daniel Mariam
*Assistant Examiner*—Shefali Patel
(74) *Attorney, Agent, or Firm*—Scully, Scott, Murphy & Presser

(57) ABSTRACT

A watermarking system allowing both sufficiently high quality of watermarked moving pictures and enhanced ease of watermark detection is disclosed. A watermark level of a watermark to be embedded into a picture of data is changed depending on the picture type of a selected block of frequency component data, and then a watermark having the watermark level is inserted into the selected block of frequency component data. Therefore, a moving-picture can be effectively embedded with a digital watermark without substantially reducing the quality of image and the digital watermark can be detected reliably. A relative proportion of watermark levels of I-picture, B-picture, and P-picture is preferably set to 10:7:5.

3 Claims, 5 Drawing Sheets

DIGITAL WATERMARKING TECHNIQUE

BACKGROUND OF THE INVENTION

1. Field of the Invention

The present invention relates to digital watermarking of moving-picture data and in particular to a method and system for inserting watermark data into the moving-picture data.

2. Description of the Prior Art

With wide-spreading digital satellite broadcasting, Internet transmission and DVD (Digital Video Disk), etc. in recent years, digital images are becoming easily accessible to users. Since the quality of digital images does not deteriorate when they are copied, securing their copyrights has been an important issue.

For purposes of securing copyright protection for MPEG (moving picture experts group) data, there have been disclosed a watermarking system for embedding a plurality of watermarks into DCT (discrete cosine transform) coefficient domain of MPEG data and a watermark detecting system for extracting and detecting the embedded watermarks from the watermarked MPEG data (see Japanese Patent Application Unexamined Publication No. 11-55639).

More specifically, a plurality of watermarks different from each other are previously stored each corresponding to picture types (I-, B-, and P-pictures in MPEG). In the watermarking system, one watermark is selected from the plurality of watermarks depending on the type of a picture to be encoded and is embedded into the image data in units of 8×8 DCT coefficient block.

Assuming that f(1), f(2), ..., f(n) are DCT coefficients listed in frequency-ascending order, a watermarked coefficient F(i) is calculated by the following equation:

$$F(i)=f(i)+\alpha \times avg(f(i)) \times w(i),$$

where i=1, 2, 3, ..., n, w(i) is an element of a water mark selected according to a normal distribution with mean mx=0 and variance $\sigma^2=1$, $\alpha$ is a scaling element, and avg(f(i)) represents a local average over three DCT coefficients in the neighborhood, which is calculated by the following form:

$$avg(f(i))=(|f(i-1)|+|f(i)|+|f(i+1)|)/3.$$

On the other hand, the watermark detecting system can detect an embedded watermark without the need of the original image data. The watermarked MPEG data is decoded and a watermark is extracted from the DCT components of the decoded data using the local average over the neighborhood. A watermark element W(i) is extracted by calculating the following form: F(i)/avg(F(i)). A watermark element W(i) is accumulated in one frame/field to produce WF(i).

A statistical similarity C between w(i) and WF(i) can be calculated using vector inner product as follows:

$$C=WF \times w/(|WF| \times |w|)$$

where WF=(WF(1), WF(2), ..., WF(n)) and w=(w(1), w(2), ..., w(n)).

If the statistical similarity C calculated as described above exceeds a predetermined threshold, it is determined that the corresponding watermark is embedded in the MPEG data.

However, the inventor found that a degree of embedded watermark effect on MPEG data is varied depending on the type of a picture in MPEG. If watermark frequency coefficients having a certain amplitude (level) is uniformly embedded to MPEG data regardless of the type of a picture as the prior art, then there are cases where the quality of image is deteriorated and the embedded watermark is hard to be detected.

More specifically, when the watermark is strongly embedded to the MPEG data, ease of watermark detection is enhanced but the quality of image is deteriorated. Contrarily, when the watermark is lightly embedded to the MPEG data, the quality of image is kept sufficiently but the embedded watermark becomes hard to be detected. In other words, the quality of a watermarked image is traded off against watermark detection efficiency.

SUMMARY OF THE INVENTION

It is an object of the present invention to provide a watermarking system and method allowing both sufficiently high quality of watermarked moving pictures and enhanced ease of watermark detection.

According to the present invention, a method for inserting a watermark into a selected block of frequency component data in a picture of data having one of a plurality of picture types, includes the steps of: determining a picture type of the selected block of frequency component data; determining a watermark level depending on the picture type of the selected block of frequency component data; and inserting a watermark having the watermark level into the selected block of frequency component data.

The picture types are preferably Intra-frame coding picture (hereafter, I-picture), Inter-frame Predictive coding picture (hereafter, P-picture) and Bidirectionally Predictive coding picture (hereafter, B-picture), wherein a relative proportion of watermark levels of I-picture, B-picture, and P-picture is 10:7:5.

As described above, a watermark level of a watermark to be embedded into a picture of data is changed depending on the picture type of a selected block of frequency component data, and then a watermark having the watermark level is inserted into the selected block of frequency component data. Therefore, a moving-picture can be effectively embedded with a digital watermark without substantially reducing the quality of image and the digital watermark can be detected reliably.

According to an embodiment of the present invention, a method includes the steps of: storing a plurality of watermarks for each picture type, each of the watermarks corresponding to a different block of the picture of data; determining a picture type of the selected block of frequency component data; determining a watermark level depending on the picture type of the selected block of frequency component data; selecting a watermark from the plurality of watermarks depending on which block is selected; and inserting a selected watermark having the watermark level into the selected block of frequency component data.

According to another embodiment of the present invention, a method includes the steps of: a) storing a plurality of watermarks for each of the picture types, wherein a watermark level of the watermarks varies depending on a picture type; b) selecting a watermark of a type depending on a picture type of the selected block of frequency component data; and c) inserting a watermark of a selected type into the selected block of frequency component data.

According to still another embodiment of the present invention, a method includes the steps of: a) storing a reference watermark; b) determining a picture type of the selected block of frequency component data; c) changing a watermark level of the reference watermark depending on the picture type of the selected block of frequency component data to produce a watermark to be used; and d) inserting the watermark to be used into the selected block of frequency component data.

In the step (c), the watermark level of the reference watermark may be changed depending on both the picture type of the selected block of frequency component data and the selected block.

According to another aspect of the present invention, a method for detecting a watermark from a selected block of frequency component data in a picture of data having one of a plurality of picture types, includes the steps of: storing a plurality of watermarks for each of the picture types, wherein a watermark level of the watermarks varies depending on a picture type; extracting a watermark from the selected block in the picture of data; selecting a watermark of a type depending on a picture type of the selected block; and determining whether the stored watermark is embedded in the selected block, based on an extracted watermark with a selected watermark.

According to the present invention, a system for inserting a watermark into a selected block of frequency component data in a picture of data having one of a plurality of picture types, includes: a table storing a plurality of watermarks for each of the picture types, wherein a watermark level of the watermarks varies depending on a picture type; a selector for selecting a watermark of a type depending on a picture type of the selected block of frequency component data; and an inserting section for inserting a selected watermark of a selected type into the selected block of frequency component data.

According to the present invention, a system includes: a memory storing a reference watermark; a determiner for determining a picture type of the selected block of frequency component data; a multiplier for multiplying a watermark level of the reference watermark by a factor varying depending on the picture type of the selected block of frequency component data to produce a watermark to be used; and an inserting section for inserting the watermark to be used into the selected block of frequency component data.

The multiplier may multiply a watermark level of the reference watermark by a factor varying depending on both the picture type of the selected block of frequency component data and the selected block.

The picture types are preferably Intra-frame coding picture (hereafter, I-picture), Inter-frame Predictive coding picture (hereafter, P-picture) and Bidirectionally Predictive coding picture (hereafter, B-picture), wherein a relative proportion of factors corresponding to I-picture, B-picture, and P-picture is 10:7:5.

DETAILED DESCRIPTION OF THE PREFERRED EMBODIMENTS

Hereafter, the preferred embodiments of the present invention will be described in detail.

First Embodiment

Figure 1:
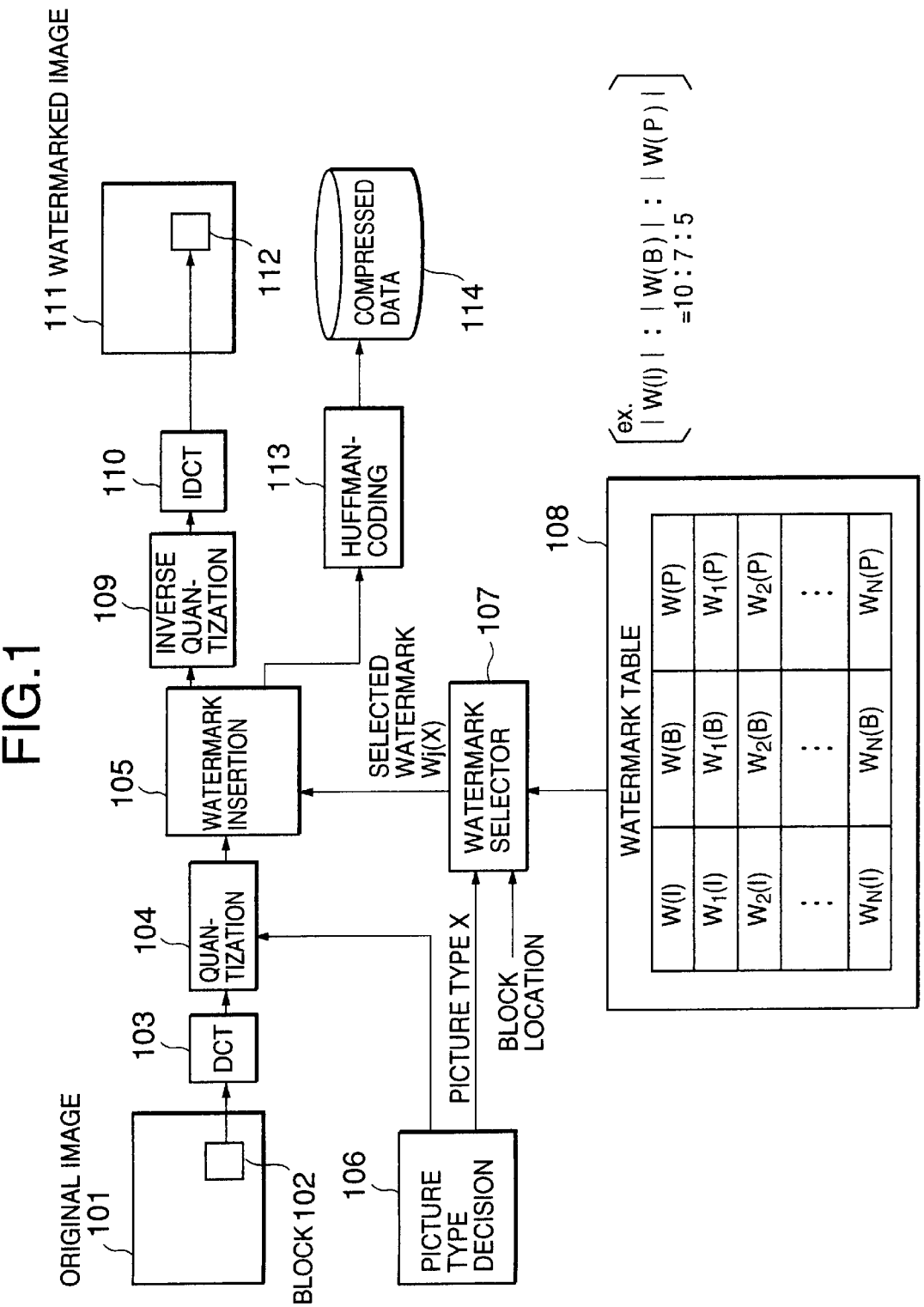
FIG. 1 is a block diagram showing a configuration of a watermark insertion system according to a first embodiment of the present invention.

Referring to FIG. 1, an original image 101 stored in a frame/field memory is divided into a plurality of k×k pixel blocks (here, k=8), which are sequentially read out as block image data 102. The block image data 102 is converted into DCT coefficient data by a DCT section 103 and then the DCT coefficient data is quantized by a quantization section 104 depending to a picture type of the original image 101. The quantized DCT coefficient data is output to a watermark insertion section 105.

A picture type decision section 106 detects the picture type X of block image data 102 when the block image data 102 is encoded in a way conforming to a predetermined standard such as MPEG or H.261. In MPEG2 standard, each frame is one of three types of picture, Intra-frame coding Picture (hereinafter referred to as "I picture"), inter-frame Predictive coding Picture (hereinafter referred to as "P picture") and Bidirectionally predictive coding Picture (hereinafter referred to as "B picture").

The watermark insertion section 105 embeds a watermark selected by a watermark selector 107 to the quantized DCT coefficient data. The watermark selector 107 selects a watermark from a watermark table 108 depending on the block location information and the picture type X detected by the picture type decision section 106.

The watermark table 108 contains three kinds of watermark, W(I), W(B), and W(P), corresponding to I-picture, B-picture, and P-picture, respectively. The I-picture watermark W(I) consists of N watermarks: $W_1(I)$, $W_2(I)$, ..., $W_N(I)$, which correspond to the blocks of an I-picture, respectively. The B-picture watermark W(B) consists of N watermarks: $W_1(B)$, $W_2(B)$, ..., $W_N(B)$, which correspond to the blocks of a B-picture, respectively. The P-picture watermark W(P) consists of N watermarks: $W_1(P)$, $W_2(P)$, ..., $W_N(P)$, which correspond to the blocks of a P-picture, respectively. A watermark is represented by a set of watermark DCT coefficients.

According to the present embodiment, the relative proportion of the respective levels of I-, B-, and P-picture watermarks is set to $|W(I)|:|W(B)|:|W(P)|=10:7:5$. A set of watermark DCT coefficients, $W_j(X)$ (j=1, 2, ..., or N and X=I, B, or P), is obtained by multiplying a reference watermark W(e) by a picture-dependent level coefficient $k_j(X)$, that is, $W_j(X)=k_j(X)\times W(e)$, wherein $k_j(I):k_j(B):k_j(P)=10:7:5$.

For example, the reference watermark W(e) may be 8-bit data "10101010", in which the first bit represents the presence/absence of copyright protection, the second bit represents permission/inhibition of copying, and the third bit represents the limited number of copying operations.

Thereafter, the watermark-embedded DCT coefficient data is inverse-quantized by an inverse-quantization section 109 and then the output of the inverse-quantization section 109 is converted by an inverse-DCT (IDCT) section 110 into watermarked block image data 112, which is stored at the same location as the block 102 of the original image 101. By repeatedly performing the above procedure on the blocks over an entire frame/field of the original image 101, a watermarked image 111 is completed.

On the other hand, the watermark-embedded DCT coefficient data is subjected to Huffman-coding by an encoder 113 and the Huffman-coding is repeatedly performed over the entire frame/field to produce compressed moving-picture data 114 such as MPEG data. The compressed moving-picture data 114 may be stored in a recording medium such as DVD or another storage device.

Figure 2:
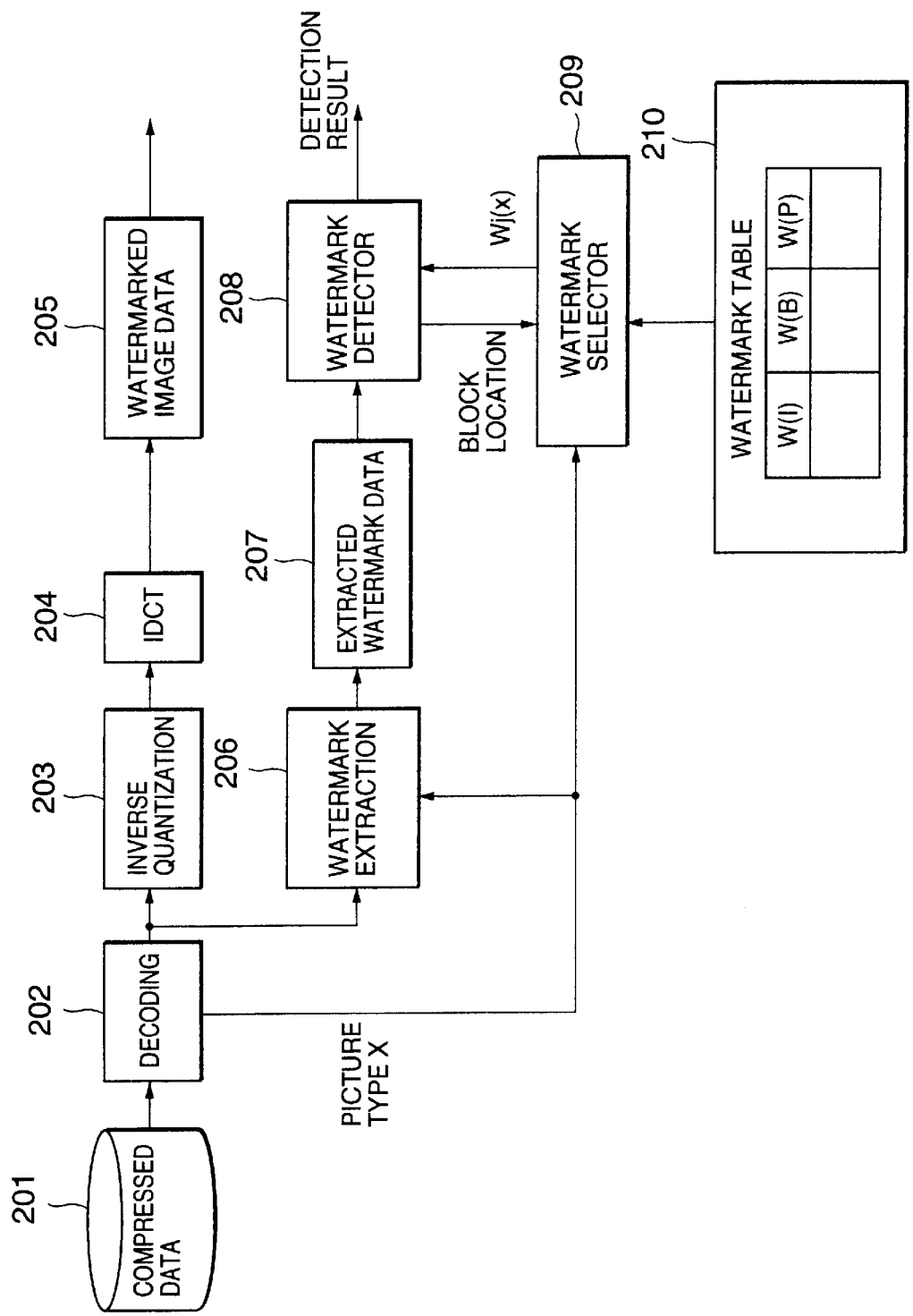
FIG. 2 is a block diagram showing a configuration of a watermark detection system according to the first embodiment of the present invention.

Referring to FIG. 2, watermarked compressed data 201 that was produced as described above is decoded by a decoder 202 to produce watermark-embedded DCT coefficient data. The watermark-embedded DCT coefficient data is inverse-quantized by an inverse-quantization section 203 and then the output of the inverse-quantization section 203 is converted by an IDCT section 204 into watermarked image data 205.

The watermark-embedded DCT coefficient data decoded by the decoder 202 is also output to a watermark extractor 206. The watermark extractor 206 extracts watermark data on a block-by-block basis from the watermark-embedded DCT coefficient data and stores all the extracted watermark data of a picture in a memory 207. Thereafter, a watermark detector 208 reads out the extracted watermark data on a block-by-block basis from the memory 207 and calculates a statistical similarity C based on the extracted watermark and a registered watermark selected by a watermark selector 209. As described before, by comparing the calculated statistical similarity C with a predetermined threshold, it is determined whether the registered watermark is embedded in the block in question.

The watermark selector 209 selects watermark data from a watermark table 210 depending on the block location information and the type X of the picture. The watermark table 210 contains the same contents as the watermark table 108. That is, the watermark table 210 contains three kinds of watermark: W(I), W(B), and W(P) corresponding to I-picture, B-picture, and P-picture, respectively. Each of the I-, B-, and P-picture watermarks W(I), W(B), and W(P) consists of N watermarks, that is, $(W_1(I), W_2(I), \ldots, W_N(I))$, $(W_1(B), W_2(B), \ldots, W_N(B))$, and $(W_1(P), W_2(P), \ldots, W_N(P))$.

Operation

Hereafter, an operation of the present invention will be described, taking an example compressed moving-picture data conforming to MPEG standard.

Figure 3:
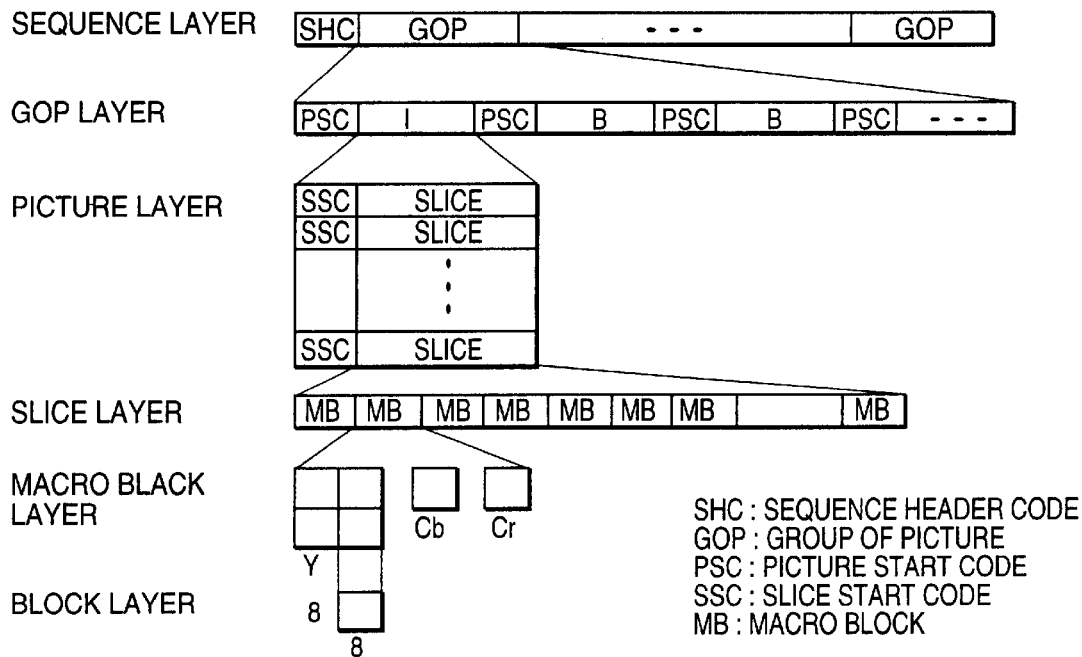
FIG. 3 illustrates a layered structure of an MPEG standard format.

Referring to FIG. 3, image data that has been compressed according to MPEG standard has such a structure that a sequence header code SHC is followed by a sequence of GOP (group of picture). Here, data of each frame/field of an image is written in a picture layer following a picture start code (PSC). Each frame or field is encoded in one of three types of picture format, I picture, P picture, and B picture.

Figure 4:
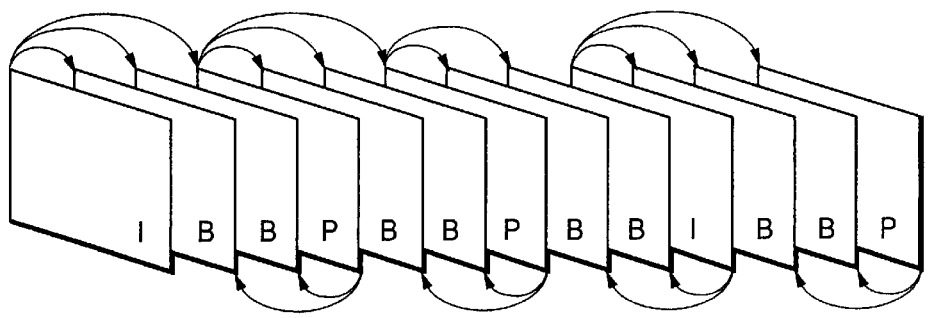
FIG. 4 is a schematic diagram showing forward/backward prediction operations in the MPEG standard format.

As shown in FIG. 4, in the case of P picture and B picture, only a difference between the own picture and a reference picture at a different time instant is encoded as image data. Moreover, each picture is subdivided into blocks and each block is subjected to the discrete cosine transform (DCT). Then, the DCT coefficients are quantized with an appropriate quantizing coefficient and the quantized DCT coefficients are subjected to two-dimensional Huffman coding.

The field data of each frame is inside a macro block (MB) layer under a slice layer following a slice start code (SSC). In the case where a color difference format is 4:2:0, the field data of each frame is expressed by a total of 6 block layers, 4 block layers indicating brightness data Y and 2 block layers indicating color difference data Cb and Cr.

Figures 5, 6:
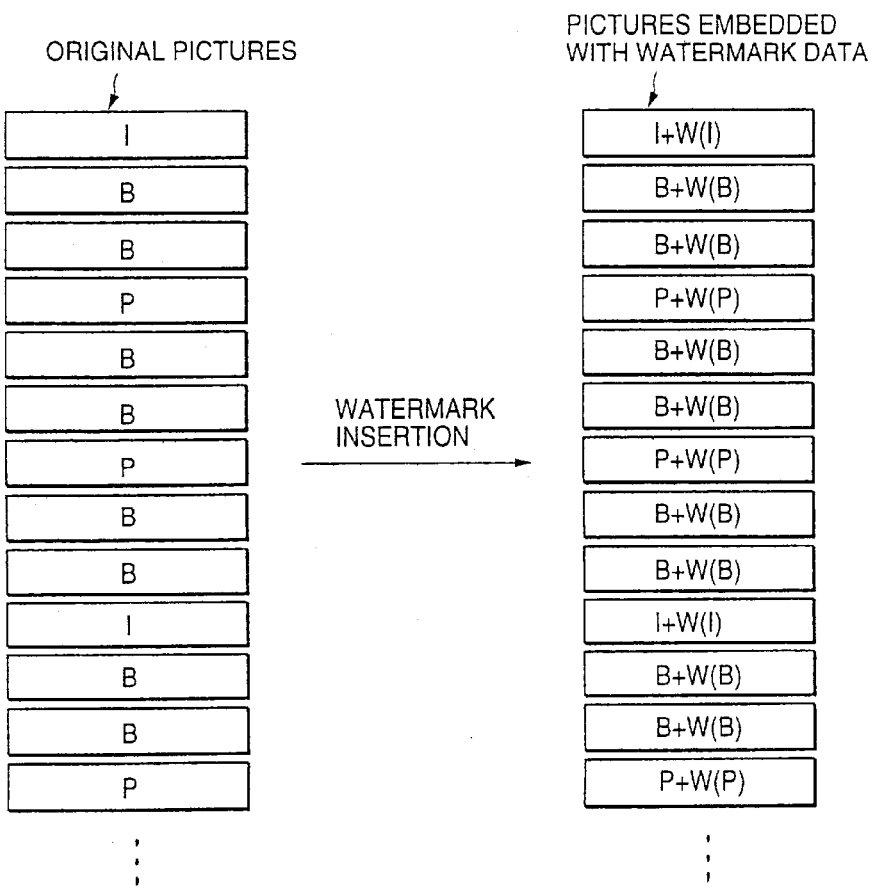
FIG. 5 illustrates a zigzag-scanning sequence.
FIG. 6 is a schematic diagram showing an example of watermark insertion operation according to the present invention.

As shown in FIG. 5, in the case of zigzag scanning, quantized DCT coefficients are scanned in a sequence of numbers and are converted to a one-dimensional sequence of 64 DCT coefficients. The position labeled with "1" in the figure expresses a DC component of the DCT domain. Horizontal spacial frequency increases from this position "1" rightward and vertical frequency increases from this position "1" downward.

Thus, zigzag scanning virtually results in a one-dimensional sequence in order from low-frequency components to high-frequency components. A watermark is embedded to a block of MPEG data by adding each of watermark DCT coefficients to a corresponding one of the 64 DCT coefficients.

Referring to FIG. 6, in the case where an original image is an I-picture and a j-th block is read out, the watermark selector 107 selects the I-picture watermark $W_j(I)$ from the watermark table 108. The watermark insertion section 105 adds the DCT coefficients of the selected watermark $W_j(I)$ to corresponding ones of the quantized DCT coefficients to produce a watermarked I-picture indicated by I+W(I). Similarly, in the case where an original image is a B-picture, the watermark selector 107 selects the B-picture watermark DCT coefficients $W_j(B)$ from the watermark table 108.

The watermark insertion section 105 adds the selected watermark DCT coefficients $W_j(B)$ to corresponding ones of the quantized DCT coefficients to produce watermarked B-picture indicated by B+W(B). In the case where an original image is a P-picture, a watermarked P-picture indicated by P+W(P) is produced by the watermarked insertion section 105.

As described before, the relative proportion of the respective levels of I-, B-, and P-picture watermarks is not equal. In this embodiment, $|W(I)|:|W(B)|:|W(P)|$ is set to 10:7:5. Watermark DCT coefficients $W_j(X)$ (j=1, 2, ..., N and X=I, B, or P) is obtained by multiplying reference watermark data W(e) by a picture-dependent level coefficient $k_j(X)$, that is, $W_j(X)=k_j(X)\times W(e)$, wherein $k_j(I):k_j(B):k_j(P)=10:7:5$.

By setting the relative level proportion of the watermarks W(I), W(B) and W(P) to 10:7:5, picture degradation can be kept at a minimum while the watermark detection efficiency is kept at a sufficient level.

Further, the Inventor found that the larger the total of the relative level proportion values, I+B+P, (here, 1+0.7+0.5= 2.2), the greater picture degradation. Relative to I+B +P=2.2, picture degradation becomes greater in the case of I+B+P=3. Contrarily, in the case of I+B+P=1.5, picture degradation becomes smaller but an embedded watermark is harder to be detected.

Second Embodiment

A watermarking system according to a second embodiment of the present invention will be described with reference to FIG. 7, where circuit blocks similar to those previously described with reference to FIG. 1 are denoted by the same reference numerals and the details will be omitted.

Figure 7:
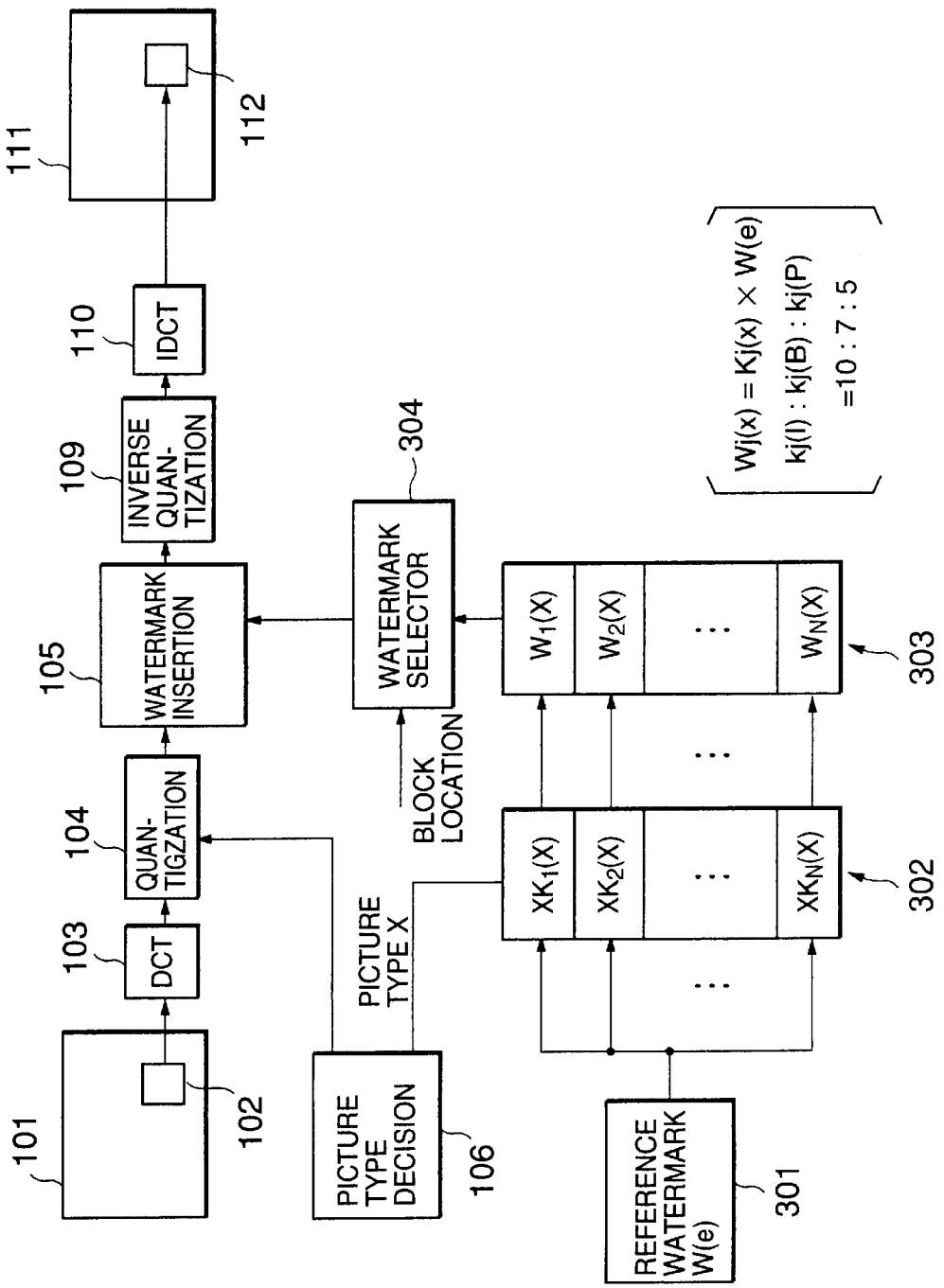
FIG. 7 is a block diagram showing a configuration of a watermark insertion system according to a second embodiment of the present invention.

Referring to FIG. 7, the watermarking system according to the second embodiment is formed by replacing a combination of the watermark selector 107 and the watermark table 108 in the first embodiment with a circuit composed of a memory 301 storing a reference watermark W(e), N multipliers 302, N memories 303, and a watermark selector 304.

The respective watermarks $W_j(X)$ (j=1, 2, ..., N and X=I, B, or P), are obtained by the multipliers 302 multiplying the reference watermark W(e) by N picture-dependent level coefficients $k_j(X)$, that is, $W_j(X)=k_j(X) \times W(e)$. More specifically, in the case of I-picture, the respective multipliers 302 are set at $k_1(I)$, $k_2(I)$, ..., and $k_N(I)$. Therefore, I-picture watermarks $W_j(I)$ are obtained by $k_j(I) \times W(e)$. Similarly, in the case of B-picture, the respective multipliers 302 are set at $k_1(B)$, $k_2(B)$, ..., and $k_N(B)$, and in the case of P-picture, the respective multipliers 302 are set at $k_1(P)$, $k_2(P)$, ..., and $k_N(P)$. Therefore, the watermark selector 304 can select one of the watermarks stored in the memories 303 depending on the location of a block to be embedded with a selected watermark. This is the same operation as the first embodiment.

As in the first embodiment, $k_j(I):k_j(B):k_j(P)$ is preferably set to 10:7:5. Therefore, the same advantages as the first embodiment are also achieved in the second embodiment. Further, according to the second embodiment, only N memories 303 are needed to store the necessary watermarks. Therefore, compared with the first embodiment, the necessary amount of memory can be reduced.

The watermark selector 209 and the watermark table 210 in the watermark detection system as shown in FIG. 2 may be replaced with the circuit composed of the memory 301 storing the reference watermark W(e), the N multipliers 302, the N memories 303, and the watermark selector 304.

The above-described embodiments have been explained taking the MPEG standard coding system as an example, but of course the present invention is applicable to other image coding systems using DCT, for example, JPEG standard and H.261 as well.

The watermark insertion and detection according to the above described embodiments can also be implemented by a computer running a program that instructs the computer to execute these operations.

As described above, according to the present invention, the amplitude or level of a watermark to be embedded to moving-picture data is set to an optimal level for each picture type in the moving-picture data. Therefore, both sufficiently high quality of watermarked moving picture data and enhanced ease of watermark detection can be achieved.

What is claimed is:

1. A method for inserting a watermark into a selected block of frequency component data in a picture of data having one of a plurality of picture types, comprising the steps of:

determining a picture type of the selected block of frequency component data;

determining a watermark level depending on the picture type of the selected block of frequency component data; and inserting a watermark having the watermark level into the selected block of frequency component data, wherein the picture types are Intra-frame coding picture (hereafter, I-picture), Inter-frame Predictive coding picture (hereafter, P-picture) and Bidirectionally Predictive coding picture (hereafter, B-picture), wherein a relative proportion of watermark levels of I-picture, B-picture, and P-picture is 10:7:5.

2. A method for inserting a watermark into a selected block of frequency component data in a picture of data having one of a plurality of picture types, comprising the steps of:

storing a plurality of watermarks for each picture type, each of the watermarks corresponding to a different block of the picture of data;

determining a picture type of the selected block of frequency component data:

determining a watermark level depending on the picture type of the selected block of frequency component data;

selecting a watermark from the plurality of watermarks depending on which block is selected; and inserting a selected watermark having the watermark level into the selected block of frequency component data, wherein the picture types are Intra-frame coding picture (hereafter, I-picture), Inter-frame Predictive coding picture (hereafter, P-picture) and Bidirectionally Predictive coding picture (hereafter, B-picture), wherein a relative proportion of watermark levels of I-picture, B-picture, and P-picture is 10:7:5.

3. A method for inserting a watermark into a selected block of frequency component data in a picture of data having one of a plurality of picture types, comprising the steps of:

a) storing a plurality of watermarks for each of the picture types, wherein a watermark level of the watermarks varies depending on a picture type;

b) selecting a watermark of a type depending on a picture type of the selected block of frequency component data; and c) inserting a watermark of a selected type into the selected block of frequency component data;

wherein the picture types are Intra-frame coding picture (hereafter, I-picture), Inter-frame Predictive coding picture (hereafter, P-picture) and Bidirectionally Predictive coding picture (hereafter, B-picture), wherein a relative proportion of watermark levels of I-picture, B-picture, and P-picture is 10:7:5.

* * * * *